Feb. 28, 1961 E. G. TOUCEDA 2,972,785
MECHANICAL ELEMENTS FORMED FROM
ALUMINA-FILLED POLYESTER RESINS
Filed Jan. 13, 1956
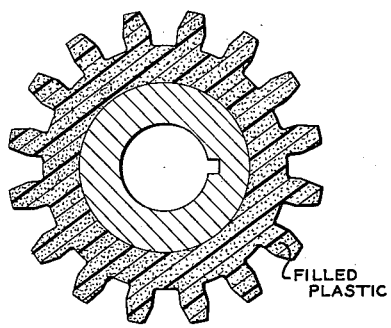
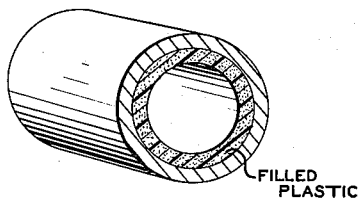
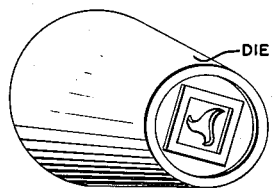
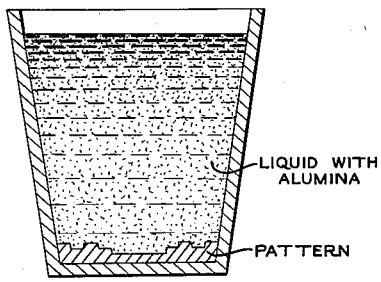
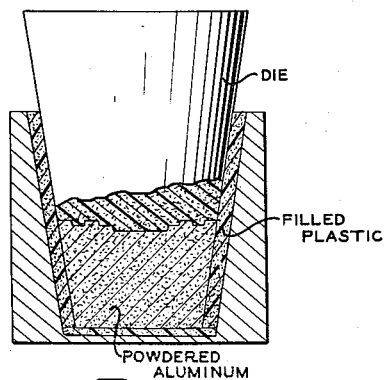
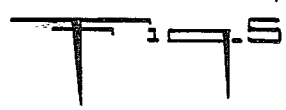
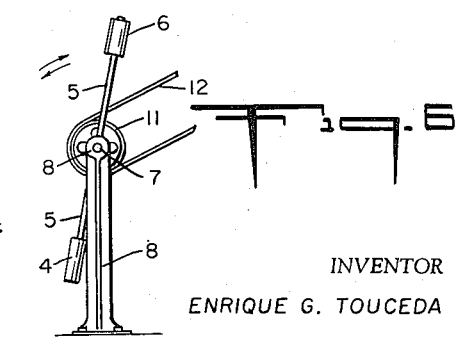
INVENTOR
ENRIQUE G. TOUCEDA
BY
ATTORNEY

United States Patent Office 2,972,785
Patented Feb. 28, 1961

2,972,785

MECHANICAL ELEMENTS FORMED FROM ALUMINA-FILLED POLYESTER RESINS

Enrique G. Touceda, Turkey Run Road, McLean, Va.

Filed Jan. 13, 1956, Ser. No. 559,088

11 Claims. (Cl. 18—59.3)

This invention relates to alumina-filled casting resins from liquid resinous products catalyzed to solid resins having extremely high compressive strength, wear resistance and low shrinkage, and applied for use as compression resistive surfaces upon tools, dies and as machine elements per se, wherein these properties of the resin find outstanding utility.

More particularly, my resin is cast from an alumina-filled liquid unsaturated polyester modified with some saturated polyester components condensed to a liquid linear pre-polymer water-free state, mixed with liquid monomeric cross-polymerizing components, whereby the liquid linear partial polymer and monomer may be copolymerized by oxidizing catalysts of the peroxide type to a solid hard resin at moderate or raised temperatures. Such liquid resin composition is filled with 30 to 65% of very fine levigated aluminum oxide particles whereby great compressive strength and low shrinkage is imparted to the cast resinous product.

The attached drawing illustrates diagrammatically the formation of castings from this alumina filled resin, several useful mechanical elements into which the resin is formed and use of such resins as useful mechanical elements in which Fig. 1 is a section through a common type of gear in which at least the outer working toothed portion is composed of cast alumina filled resin;

Fig. 2 illustrates a typical sleeve type bearing at least the inner friction exposed surface being formed of alumina filled plastic;

Fig. 3 illustrates a typical moulding in which liquid resin filled with alumina is poured upon a lower pattern element to form, upon setting to a hard resin filled with alumina, a die element;

Fig. 4 illustrates a finished casting comprising a die useful as a pressing element in a press to impart the cast configuration on its working face as shown, which may be the product moulded in Fig. 3;

Fig. 5 illustrates the die of Fig. 4 mounted as the cast pressure imparting element of a moulding press filled with powdered aluminum, all of the remaining stationary surfaces of the mould being lined with the pressure resistant alumina filled plastic of this invention; and Fig. 6 illustrates a device known in the art and described in detail in U.S. Patent 1,541,831 useful for centrifugally casting alumina filled liquid resin of this invention.

The linear polyester component of my resin is a condensate of an alpha-beta unsaturated polymerizable dibasic acid such as maleic or fumaric acids, with a lower polyhydric alcohol such as ethylene glycol, propylene glycol, diethylene glycol, or glycerol, preferably modified with up to 50 mol percent of saturated linear polyester forming components such as phthalic acid or succinic acid. In the pre-polymer, the acids may be used in the form of their anhydrides and prepolymerization will be effected by heating the mixture at a temperature between about 105 and about 140° C. for a period of several hours until water vapors are no longer evolved. During reaction the liquid mixture is protected from air by sweeping with inert gas such as carbon dioxide. The liquid polyester polymer formed is then blended with a cross-linking monomer liquid in quantity up to 50 mol percent, preferably 25 to 50, such as a vinyl monomer capable of setting by oxidation and forming cross linkages in the unsaturated linear polyester.

These liquid unsaturated polyester polymers modified with a vinyl monomer and copolymerized with an oxidation catalyst normally sets to a resin with a shrinkage of from 6 to 8%. These resins have a high tensile strength and ductility which can be greatly increased as desired by incorporation of glass fiber, to great tensile strength and durability. However, the compressive strengths of such resins are relatively low.

According to this invention I have found that the incorporation of very finely divided levigated alumina, water floated to separate substantially colloidal particles of a size of about 0.1 to 3 microns in quantity of 30 to 65% by weight, will reduce the shrinkage of the cast resin to very low values. Such alumina-filled cast resins will shrink less than 1%, and most will shrink less than ½%, when cast by static means where extreme reduction of shrinkage is not so essential. When the alumina-filled resin is cast centrifugally or under pressure, the shrinkage is reduced to substantially nil.

Moreover, I have found that such cast resins have an unfilled compressive strength of less than about 21,000 lbs. per square inch at 77° F. When filled with 30 to 65% of the alumina, the cast resins will have compressive strength raised to exceed 25,000 p.s.i. and usually from 26,000 to 28,300 p.s.i.

Thus my alumina filled vinyl modified polyester resin, because of its extremely high compressive strength and hardness and its ease of shaping by casting to such non-shrinkable high compressive strength hard product, makes such resins eminently useful for dies or surfacing material for dies since it has such low shrinkage and high compressive strength; and as tool elements or facing material for tools which need to withstand great pressures in use. Moreover, that filled resin has a high wearing strength due to its hardness and thereby is useful for cast machine element parts such as gears, bearings, etc.

My preformed liquid unsaturated polyester is desirably blended with a vinyl monomer to have a flowable liquid viscosity even after filling with levigated alumina in the above stated proportions. The linear polymer is blended with preferably from 25 to 50 mol. percent of a monomer vinyl such as styrene or vinyl toluene. However other polymerizable vinyl monomers such as vinyl esters of the character of vinyl acetate, methyl methacrylate, di allyl phthalate, etc. may be used as the monomer.

The unsaturated polyester prepolymer is first formed as described, and that linear resinous prepolymer is then blended with 25 to 50 mol. percent of the vinyl monomer. The liquid mixture is then mixed with 30 to 65 parts of levigated alumina to form a flowable filled liquid of desired viscosity and filler content.

The liquid mixture is then mixed with about ½ to 1% of an oxidizing catalyst. As oxidizing catalyst I prefer methyl ethyl ketone peroxide but other peroxides such as cymene hydro peroxide, benzoyl peroxide may be used. The peroxide catalyst usually is dissolved in a small quantity of liquid plasticizer such as dimethyl phthalate and added to the liquid resin solution in quantity of about ½ to 1%. The peroxide may also be added in the monomeric vinyl liquid as a solvent therefor. After addition of the peroxide a small quantity of accelerator such as cobalt naphthenate is added to adjust the rate of setting of the resin. That cobalt naphthenate also is added as a solution, usually at 6% solution, in the solvent which may be the same as the solvent for the peroxide, although the accelerator and peroxide must be added as separate solutions to the resin. That accelerator may vary from 0.05 to 0.75% by weight of the resin. That resin will set slowly or fast, depending upon the quantity of accelerator used.

*Example 1*

928 grams of fumaric acid, 148 grams of phthalic acid and 995 grams of diethylene glycol are heated in a bath for 6 hours at 140° C. while bubbling carbon dioxide gas through the mixture. The liquid resin pre-polymer after cooling has then added thereto 33 weight percent of styrene. The liquid polymerizable mixture is then mixed with dried powdered levigated alumina having an average particle size of 1 micron to impart a weight content of 60%. The product is a viscous liquid which will remain stable for a period exceeding 3 months. There is added thereto, and homogeneously mixed a 50% solution of methyl ethyl ketone peroxide to impart a 1% weight content. There is then added a 6% solution of cobalt naphthenate dissolved in dimethyl phthalate in quantities sufficient to impart a 0.7% weight content of the accelerator in the liquid filled resin solution. The viscous liquid filled resin is then cast in a mold. Such mold may consist of a ¾ inch glass tube having one end closed with a metal coin substantially filling that end to form a designed lower surface. The mold and resin therein was then heated at 240° F. for one-half hour. The resin, on removal from the mold reproduced the design of the coin perfectly and thereafter comparison of the cast die surface of the casting showed perfect reproduction with less than ½% shrinkage of all features. The filled resin was found to have a compressive strength of 28,300 lbs. per sq. in.

*Example 2*

784 grams of maleic anhydride, 148 grams of terephthalic acid and 558 grams of ethylene glycol are heated for 4 hours while bubbling carbon dioxide gas through the flask to form a syrupy liquid. To the cool liquid, 894 grams of styrene is added and then a further quantity of 50% solution of the alkyl phthalate containing a total of 20 grams of benzoyl peroxide, and finally 5 grams of cobalt naphthenate dissolved in the same solvent as a 6% solution is added. Thereafter 1500 grams of finely divided dried powdered levigated alumina having an average particle size of .9 micron is homogeneously stirred into the liquid resin. The resin becomes highly viscous, but is still flowable as a heavy syrup having an initial viscosity of approximately 900 cps. at 25° C. and is poured into a mold as in Example 1, the mold being first filled with loosely matted fibre glass. The mold is heated to 115° C. for one-half hour and the casting thereafter removed. It was found to have a compressive strength of 28,700 p.s.i.

The casting molded as a die, as in Example 1, was used to press aluminum powder to form same into a preform for sintering by applying pressure to powdered aluminum of the order of 20,000 p.s.i. The pressed preform of aluminum powder was subsequently sintered to a coin closely duplicating the original coin design from which the casting was formed in all respects without the usual surface imperfections which other dies usually form due to the fact that some of the aluminum particles adhere to the die, a common weakness in other die materials. The molding powder may be pure aluminum or common aluminum alloys such as aluminum alloyed with 2 to 3% of copper.

These castings accordingly, have very high resistance to wear; they are not sensitive to impact; and they have a loss in shrinkage of less than ½%, whereby they are outstandingly useful as the pressure element or surfacing element for a die surface or any tool used in imparting pressure. Of course, the entire tool itself may be formed of the resin or only the pressure resistant working surface.

The hard wearing of the filled resin makes it useful for casting gears, bearings and other small machine element parts.

The mixture of resin and filler may be made up as a liquid casting composition and stored indefinitely without catalyst or it may be stored for several weeks without accelerator and it may even be stored for several hours with catalyst in minor quantity, about 0.1 to 0.2% of accelerator, if the product is refrigerated. The mixture of filled liquid resin with catalyst and accelerator will set in several hours after casting, varying with the quantity of accelerator. The setting time with larger quantities of accelerator, .5 to 1%, will be relatively short, particularly if the product is heated up to about 150° C. Larger dimensioned castings should be cured at relatively lower temperatures. For instance, it is preferred that a casting having a thickness greater than ¾" be cured at temperatures not exceeding about 90° C.

What I claim is:

1. A mechanical element, normally subject in use to high pressure and wearing stresses, having as its exposed working surface a polyester resin filled with fine particulate levigated alumina, having a particle size in the range of 0.1 to about 3 microns, in proportion of about 30 to 65% by weight of said resin, said filled resin being characterised by having a compressive strength of at least 25,000 p.s.i.

2. A tool adapted to apply pressure from at least a portion of its working surface in use, said pressure resistant working surface being formed of a cast filled polyester resin, said resin being filled with fine particulate levigated alumina having a particle size in the range of 0.1 to 3 microns in proportion of about 30 to 65 percent by weight of said resin, said filler resin being characterized by having a compressive strength of at least 25,000 p.s.i.

3. A die adapted in use to apply pressure having its working surface shaped to desired form by casting, said die working surface consisting of an alumina filled polyester resin, said resin being filled with fine particulate levigated alumina having a particle size in the range of 0.1 to 3 microns in proportion of about 30 to 65 percent by weight of said resin, said filler resin being characterized by having a compressive strength of at least 25,000 p.s.i.

4. A machine element normally subject to high pressure and wearing stresses in normal use, having at least its exposed working surface formed of a cast alumina filled polyester resin, said resin being filled with fine particulate levigated alumina having a particle size in the range of 0.1 to 3 microns in proportion of about 30 to 65 percent by weight of said resin, said filler resin being characterized by having a compressive strength of at least 25,000 p.s.i.

5. A bearing surface normally subject to substantial pressures and frictional wear in use, having its working surface formed of a cast alumina filled polyester resin, said resin being filled with fine particulate levigated alumina having a particle size in the range of 0.1 to 3 microns in proportion of about 30 to 65 percent by weight of said resin, said filler resin being characterized by having a compressive strength of at least 25,000 p.s.i.

6. A gear normally subject in use to high pressures and frictional wear in use as a machine element, said gear being formed by casting an alumina filled polyester resin, said resin being filled with fine particulate levigated alumina having a particle size in the range of 0.1 to 3 microns in proportion of about 30 to 65 percent by weight of said resin, said filler resin being characterized by having a compressive strength of at least 25,000 p.s.i.

7. The process of forming shaped bodies comprising aluminum metal by die pressing a moldable powder comprising aluminum metal, comprising filling the molding powder to be pressed into a molding cavity of a mold and pressing the same with a pressure-imparting member, said molding cavity surface including said pressing member comprising an alumina-filled polyester resin, said resin being filled with fine particulate levigated alumina having a particle size in the range of 0.1 to 3 microns in proportion of about 30 to 65 percent by weight of said resin, said filler resin being characterized by having a compressive strength of at least 25,000 p.s.i.

8. The process of forming shaped bodies comprising aluminum metal alloy by die-pressing a moldable powder comprising aluminum metal alloy including filling the molding powder to be pressed into a moding cavity of a mold and pressing the same with a pressure-imparting member, the cavity of the molding surface including said pressing member comprising an alumina-filled polyester resin, said resin being filled with fine particulate levigated alumina having a particle size in the range of 0.1 to 3 microns in proportion of about 30 to 65 percent by weight of said resin, said filler resin being characterized by having a compressive strength of at least 25,000 p.s.i.

9. The method of forming a mechanical element normally subject in use to high pressures and wearing stresses, and having a compressive strength exceeding about 25,000 p.s.i., with less than one-half percent cast shrinkage, comprising mixing a liquid polyester resin with 30 to 65% by weight of fine particulate levigated alumina, having a particle size in the range of 0.1 to about 3 microns, pouring said liquid mixture into a mold and rotating said mold at high speeds to develop centrifugal pressure under conditions and for a period of time to set the composition.

10. Mechanical element, normally subject in use to high pressure and wearing stresses, having as its exposed working surface a cast polyester resin consisting essentially of an unsaturated polybasic acid condensate with a lower polyhydric aliphatic alcohol pre-polymer modified with 25 to 50 mol percent vinyl monomer, filled with fine particulate levigated alumina filler having a particle size in the range of 0.1 to about 3 microns in proportion of about 30 to 65% by weight of said composition, said cast filled resin having a compressive strength of at least 25,000 p.s.i.

11. Mechanical element, normally subject in use to high pressure and wearing stresses, having as its exposed working surface a polyester resin consisting essentially of a condensate of an unsaturated polybasic acid selected from the group consisting of fumaric and maleic acids with a lower polyhydric aliphatic alcohol selected from the group consisting of ethylene glycol, diethylene glycol and glycerol modified with up to 50 mol percent of a saturated polybasic acid selected from the group consisting of succinic and phthalic acids and further modified with 25 to 50 mol percent of a vinyl compound selected from the group consisting of styrene, vinyl toluene, methyl methacrylate, methyl acrylate and vinyl acetate, said resin being filled with fine particulate levigated alumina filler, having a particle size in the range of 0.1 to about 3 microns, in proportion of about 30 to 65% by weight of said composition, said filled resin having a compressive strength of at least 25,000 p.s.i.

References Cited in the file of this patent

UNITED STATES PATENTS

| | | |
|---|---|---|
| 1,440,440 | Bierman | Jan. 2, 1923 |
| 1,494,099 | Cole | May 13, 1924 |
| 1,920,139 | Crosby | July 25, 1933 |
| 1,999,062 | Sherman | Apr. 23, 1935 |
| 2,275,592 | Menihan | Mar. 10, 1942 |
| 2,327,846 | Kistler | Aug. 24, 1943 |
| 2,378,377 | Bare | June 19, 1945 |
| 2,391,752 | Stern | Dec. 25, 1945 |
| 2,437,127 | Richardson | Mar. 2, 1948 |
| 2,623,030 | Cordier | Dec. 23, 1952 |
| 2,624,072 | Delacoste et al. | Jan. 6, 1953 |
| 2,629,134 | Molitor | Feb. 24, 1953 |
| 2,653,920 | Harford | Sept. 29, 1953 |
| 2,660,573 | Lantz | Nov. 24, 1953 |
| 2,729,618 | Muller et al. | Jan. 3, 1956 |
| 2,747,231 | Reinhardt | May 29, 1956 |
| 2,751,626 | Lij j yuen et al. | June 26, 1956 |

FOREIGN PATENTS

| | | |
|---|---|---|
| 695,276 | Great Britain | Aug. 5, 1953 |